United States Patent [19]

Hupe

[11] 4,247,750
[45] Jan. 27, 1981

[54] VERTICALLY POSITIONED SUBMERGED ARC FLUX DAM

[75] Inventor: Robert F. Hupe, Somonauk, Ill.

[73] Assignee: Caterpillar Tractor Co., Peoria, Ill.

[21] Appl. No.: 807,943

[22] Filed: Jun. 2, 1977

[51] Int. Cl.³ .......................... B23K 9/18; B23K 9/32
[52] U.S. Cl. ...................................... 219/73; 219/126; 219/137 R; 219/160; 228/216
[58] Field of Search .................... 335/303, 304, 306; 219/160, 137 R, 126, 125.11, 73; 228/216

[56] References Cited

U.S. PATENT DOCUMENTS

| | | | |
|---|---|---|---|
| 2,467,311 | 4/1949 | Hudson | 219/137 R |
| 2,866,889 | 12/1958 | Dempsey | 219/160 |
| 2,941,067 | 6/1960 | Kitrell | 219/125.11 X |
| 2,972,042 | 2/1961 | Ashbaker | 219/126 |
| 3,432,915 | 3/1969 | Doyle | 219/160 X |
| 3,546,643 | 12/1970 | Virostek | 335/303 |
| 3,665,355 | 5/1972 | Sasaki | 335/306 |
| 3,763,908 | 10/1973 | Norman | 335/306 |
| 4,021,763 | 5/1977 | Steingroever | 335/303 X |
| 4,026,086 | 5/1977 | Langley | 335/306 X |

FOREIGN PATENT DOCUMENTS

| | | | |
|---|---|---|---|
| 218456 | 5/1957 | Australia | 219/160 |
| 4632725 | 10/1968 | Japan | 219/160 |
| 416344 | 9/1934 | United Kingdom | 228/216 |
| 742608 | 6/1954 | United Kingdom | 219/126 |

Primary Examiner—E. A. Golderg
Attorney, Agent, or Firm—Phillips, Moore, Weissenberger, Lempio & Majestic

[57] ABSTRACT

Relates to a flux dam for submerged arc vertical position welding. The dam comprises a sheet of high temperature stable non-metallic material, a permanent magnet aligned with a first pole thereof substantially at a first surface of the sheet for magnetically attaching the sheet to a vertical workpiece generally parallel to and spaced by the thickness of the workpiece from a generally horizontal weld area of the vertical workpiece to an abutting horizontal workpiece, the magnet extending generally towards a second surface of the sheet, the magnet being affixed in the aforementioned alignment thereof. Also relates to an improvement in a welding method using said dam.

5 Claims, 5 Drawing Figures

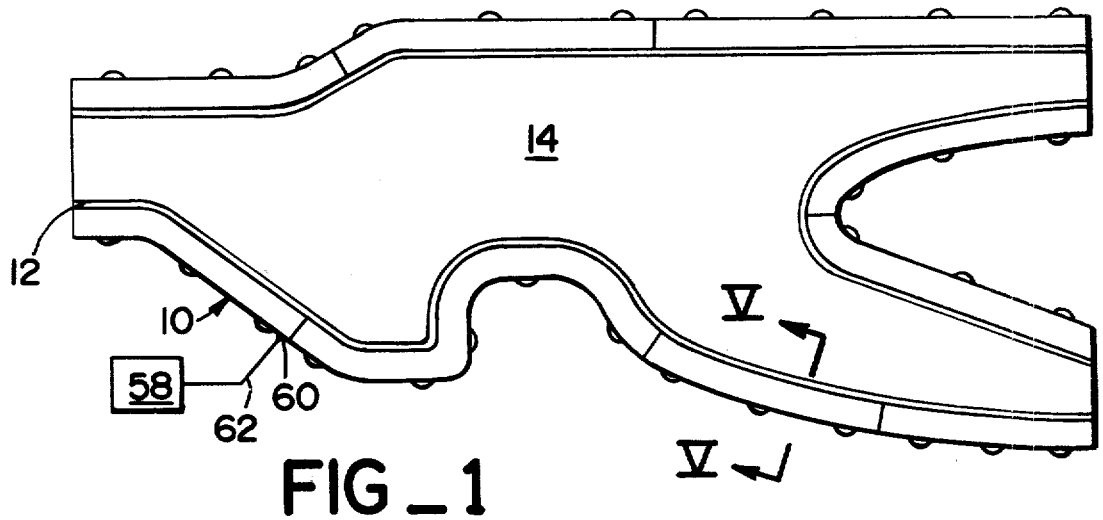
FIG_1
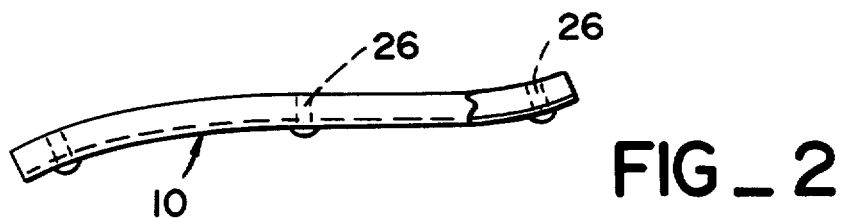
FIG_2
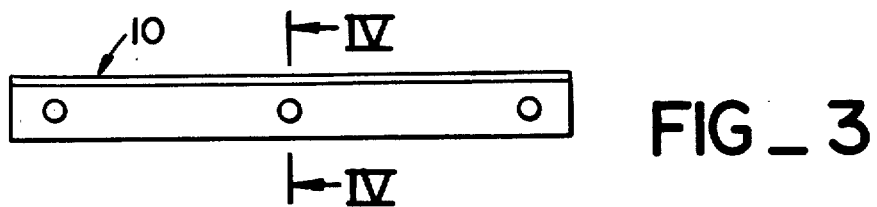
FIG_3
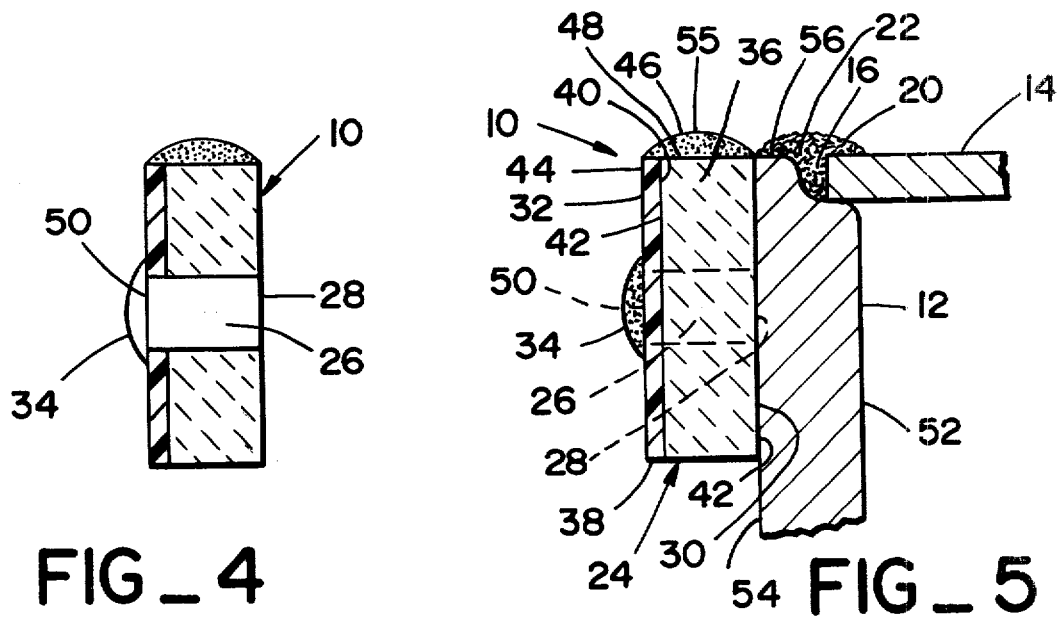
FIG_4   FIG_5

VERTICALLY POSITIONED SUBMERGED ARC FLUX DAM

BACKGROUND OF THE INVENTION

1. Field of the Invention

The invention relates to processes for welding along a horizontal groove, more particularly to a submerged arc welding process and to a particular flux dam which is useful in such a process as well as to an improved method of submerged arc welding. Also, the invention relates to the use of such a dam in other welding processes, e.g., electroslag welding.

2. Prior Art

It has been known in the prior art to use a flux dam in welding processes such as submerged arc and electroslag welding wherein the flux dam is used to retain a molten slag blanket over a pool of a molten weld metal along a horizontal weld groove. A number of problems however exist with such prior art flux dams. For example, one common prior art flux dam is a copper strip which is generally held in place by a clamp or the like. Unfortunately, copper strips tend to stick to the flux thus causing removal problems. Also, the clamps which hold the copper strips in place necessarily block at least a portion of the non weld-abutting side of a vertical workpiece which with an abutting workpiece forms a horizontal weld groove. Another common prior art flux dam comprises copper shoes on a moving belt with the shoes progressively contacting the vertical workpiece adjacent the electrode in the horizontal weld groove. A serious problem is created especially in more modern computer controlled welding wherein a sensor is used to sense the horizontal weld groove and a signal from the sensor is used to direct the movement of an automated welding electrode. In such a situation the clamps for the copper strips or the shoes-belt apparatus can get in the way of the sensor or its associated apparatus and thus interfere with such programmed welding. Also, if a metallic (copper, etc) flux dam is used this can electrically interfere with sensor operation. Further, the copper strips used as flux dams while they do have some flexibility, are often not sufficiently flexible to match some of the more highly erratic weld grooves which must be welded. Still further, even if the copper shoes are sufficiently flexible to match such a weld groove for one or a few uses, the copper soon becomes embrittled by constant bending thereof into different shapes and hence new copper strips must be used as replacements while the old copper is recycled.

The demands of modern technology are such that welds must be made along complex curves and, further, automated control of submerged arc and electroslag welding is necessary to insure its uniformity and to insure that welds can be made quickly. Thus, the above-mentioned problems which are not solved by the prior art copper strips or shoes are indeed serious. A practical and inexpensive solution of such problems would be highly desirable.

SUMMARY OF THE INVENTION

The present invention is directed to overcoming one or more of the problems as set forth above.

According to the present invention there is provided as an article of manufacture a vertically positioned welding flux dam. Such a dam comprises a sheet of flexible high temperature stable non-metallic material along with permanent magnet means aligned with first pole means thereof substantially at a first surface of said sheet for magnetically attaching said sheet to a generally vertical workpiece generally parallel to and spaced by the thickness of said workpiece from a generally horizontal weld groove of said vertical workpiece to an abutting generally horizontal workpiece, said magnet means extending generally toward a second surface of said sheet and means affixing said magnet means in said alignment thereof.

Also according to the present invention, there is provided an improvement in a welding method which comprises abutting a first side of a generally vertical workpiece against a generally horizontal workpiece to define a generally horizontal weld groove and electrically welding along said weld groove while continuously feeding flux to maintain a molten electrically conductive slag blanket covering a pool of molten weld metal along said work groove. The improvement comprises, prior to the welding, magnetically affixing a sheet of a flexible high temperature stable non-metallic material with a first surface thereof abutting a second side of said vertical workpiece and a top edge thereof extending vertically upward a short distance higher than a top edge of said vertical workpiece, said sheet serving as a flux dam for said molten slag blanket.

BRIEF DESCRIPTION OF THE DRAWINGS

The invention will be better understood by reference to the figures of the drawing wherein like numbers denote like parts throughout and wherein:

FIG. 1 illustrates in top view a plurality of generally vertical workpieces and a generally horizontal workpiece in position for being welded together along highly curved weld grooves with a flux dam in accordance with the present invention in place;

FIG. 2 illustrates in top view, partially cut away, a section of flux dam in accordance with the present invention;

FIG. 3 illustrates in side view a section of flux dam in accordance with the present invention;

FIG. 4 illustrates in section an enlarged view taken from the line IV—IV of FIG. 3; and FIG. 5 illustrates in section an enlarged view taken from the line V—V of FIG. 1.

DETAILED DESCRIPTION OF THE PREFERRED EMBODIMENT

Adverting to FIGS. 1 and 5, there is illustrated therein a submerged arc vertically positioned welding flux dam 10 in accordance with the present invention and attached adjacent a generally vertical workpiece 12 which abuts a generally horizontal workpiece 14 to define a generally horizontal weld groove 16 therebetween. The apparatus is designed for forming a weld along the groove 16 by a welding method such as submerged arc welding wherein a welding electrode is used to electrically weld along the weld groove 16 with continuous feeding of flux and electrode to the groove 16 to maintain a molten electrically conductive slag blanket 20 covering a pool of molten weld metal 22 along the weld groove 16.

FIG. 1 illustrates a complexly shaped horizontal workpiece 14 and a matching complexly shaped vertical workpiece 12 positioned for welding thereto. This figure shows the necessity for the flux dam 10 to be shapable to match the shape of the complexly shaped vertical workpiece 12 and the complexly shaped horizontal workpiece 14. After shaping the flux dam 10 is substantially inflexible and can be reused only against mating workpieces.

The flux dam 10 comprises a sheet 24 of a high temperature stable non-metallic material such as, for example, ceramic fiber insulation. A very suitable material of this nature is available under the trademark WRP of Refractory Products Company, Carpentersville, Ill. The material must be sufficiently high temperature stable to be usable at temperatures up to about 2,000° F., more preferably up to about 2300° F. and still more preferably up to about 2600° F. The material can be wet formed against a relatively complexly contoured surface and then air dried to semirigidity in a mating shape to the surface.

Permanent magnet means, in the embodiment illustrated a permanent magnet 26 which is one of a plurality of permanent magnets generally aligned along the sheet 24 are aligned with first pole means, namely a first pole 28 thereof substantially at a first surface 30 of the sheet 24 and serve to magnetically attach the sheet 24 to the vertical workpiece 12 generally parallel to and spaced by the thickness of the vertical workpiece 12 from the weld groove 16 formed by the vertical workpiece 12 and the abutting horizontal workpiece 14. The magnet 26 extends from the first pole 28 thereof generally towards a second surface 32 of the sheet 24. Means are provided for affixing the magnet 26 in the aforementioned alignment thereof through attachment to the sheet 24. In the embodiment illustrated the affixing means comprises an adhesive or glue 34 such as an epoxy glue or the like. The magnet 26 thus serves for magnetically attaching the sheet 24 to the generally vertical workpiece 12 in an alignment which is generally parallel to and spaced by the thickness of the generally vertical workpiece 12 from the generally horizontal weld groove 16 formed by the generally vertical workpiece 12 and the abutting generally horizontal workpiece 14.

The sheet 24 in the preferred embodiment of the invention comprise a ceramic fiber insulating material, preferably of the composition previously described or a similar composition, generally wet formed around the contour of workpiece 12 and into the form of a batt 36. The sheet 24 preferably further comprises a high temperature resistant somewhat flexible but form retaining plastic plate 38 attached along a first surface 40 thereof to the batt 36 with a first surface 42 of the batt 36 corresponding to the first surface 30 of the sheet 24 and a second surface 44 of the plate 38 corresponding to the second surface 32 of the sheet 24. The plastic plate 38 adds strength and rigidity to the sheet 24. The plate 38 can be shaped to match the contour of the batt 36 as by coating the plastic material while still in fluid form on the batt 36 and allowing or causing the plastic material to harden to form the plate 38. The flux dam 10 preferably include a high temperature resistant member 46, generally in the form of a high temperature resistant coating, affixed along a top edge 48 of the sheet 24. The high temperature resistant member or coating 46 then forms a coated part of the plate 24 which coated part is generally in contact with the slag 20 whereby the batt 36 is protected from damage. As will be noted by reference to FIG. 1 the adhesive 34 of the affixing means generally serves to attach a second pole 50 of the magnet 26 to the second surface 44 of the sheet 24 and more particularly to the second surface 44 of the plate 38.

The plate 38 preferably comprises a plastic material. The preferred plate 38 comprises glass fibers in a plastic matrix and generally comprises a material which is normally referred to as a glass fiber backing. Such a material has moderate temperature resistance and hardens to sufficient rigidity and strength for the desired use.

Method

The flux dam 10 of the present invention is used by abutting a first side 52 of the generally vertical workpiece 12 against the second generally horizontal workpiece 14 to define the generally horizontal weld groove 16. The sheet 24 of the flexible high temperature stable non-metallic material is shaped to fit against the workpiece 12, hardened and then magnetically affixed with a first surface 30 thereof abutting a second side 54 of the vertical workpiece 12 and with a top edge 55 of the member 46 extending vertically upward a short distance higher than a top edge 56 of the vertical workpiece 12. Electrical welding then proceeds along the weld groove 16 with continuous feeding of flux and electrode to maintain the molten electrically conductive slag blanket 20 covering the pool of molten weld metal 22 along the weld groove 16. The sheet 24 thus serves as a flux dam for the molten slag blanket 20.

The flux dam 10 of the present invention finds particular use in a method wherein the welding apparatus includes conventional control means 58 represented schematically in FIG. 1 which conventionally control the welding to follow a predetermined path corresponding to the groove 16. Conventional sensor means illustrated schematically by the line end 60 serve to move along the second surface 44 of the sheet 24 opposite the groove 16. The sensor means 60 sense the location of the groove 16 and delivers a signal as represented by a line 62 to the control means 58 indicative of the location of the groove 16. It will be noted that there are no encumberances to the movement of the sensor means 60 along the second surface of the sheet 24 and that hence the sensor means 60 can follow a quite complex and curvaceous path without interference from the dam 10. Also, it will be noted that the non-metallic material used in forming the flux dam 10 assures that the flux dam 10 will not become stuck to the weld metal and assures no electrical interference with the operation of the sensor means 60. Thus, it is clear that the present invention solves each and every one of the previously mentioned problems of prior art flux dams.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. As an article of manufacture a generally vertically positioned flux dam, comprising:

a sheet of high temperature stable non-metallic material;

a high temperature resistant coating affixed along a top edge of said sheet;

permanent magnet means aligned with first pole means thereof substantially at a first surface of said sheet magnetically attaching said sheet to a generally vertical workpiece generally parallel to and spaced by the thickness of said vertical workpiece from a generally horizontal weld groove of said vertical workpiece to an abutting workpiece, said magnet means extending generally towards a second surface of said sheet; and means affixing said magnet means in said alignment thereof.

2. A flux dam as in claim 1, wherein said sheet comprises a ceramic fiber insulating material.

3. A flux dam as in claim 2, wherein said sheet further comprises a high temperature resistant plate attached along a first surface thereof to said ceramic fiber insulating material and wherein a first surface of said ceramic fiber insulating material corresponds to said first surface of said sheet and a second surface of said plate corresponds to said second surface of said sheet.

4. A flux dam as in claim 3, wherein said flexible plate comprises a plastic plate.

5. A flux dam as in claim 4, wherein said plastic plate comprises glass fibers in a plastic matrix.

* * * * *